US007995722B2

(12) United States Patent
Vayssiere

(10) Patent No.: US 7,995,722 B2
(45) Date of Patent: Aug. 9, 2011

(54) DATA TRANSMISSION OVER AN IN-USE TRANSMISSION MEDIUM

(75) Inventor: Julien J. P. Vayssiere, Red Hill (AU)

(73) Assignee: SAP AG, Waldorf (DE)

( * ) Notice: Subject to any disclaimer, the term of this patent is extended or adjusted under 35 U.S.C. 154(b) by 1550 days.

(21) Appl. No.: 11/051,170

(22) Filed: Feb. 4, 2005

(65) Prior Publication Data
US 2006/0178115 A1    Aug. 10, 2006

(51) Int. Cl.
*H04M 11/06* (2006.01)
*H04B 1/38* (2006.01)
*H04J 7/00* (2006.01)

(52) U.S. Cl. .......... 379/93.03; 348/14.01; 370/212; 370/260; 370/352; 379/88.19; 379/93.19; 381/94.1; 455/90.2; 455/415; 704/220; 709/206

(58) Field of Classification Search ........ 348/423.1, 348/14.01, 14.02, 14.07; 379/283, 67.1, 379/88.19, 93.03, 93.09, 93.18, 202.01, 90.01; 708/300; 713/176; 370/352, 252, 260, 276, 370/337, 354, 509, 329, 494, 212; 375/240.26; 381/119, 94.1; 455/415, 90.2; 600/300; 709/217, 206; 704/220
See application file for complete search history.

(56) References Cited

U.S. PATENT DOCUMENTS

| 4,268,721 | A | | 5/1981 | Nielson et al. |
| 5,036,513 | A | * | 7/1991 | Greenblatt ............ 370/259 |
| 5,214,650 | A | * | 5/1993 | Renner et al. ............ 370/276 |
| 5,473,631 | A | * | 12/1995 | Moses ............ 375/130 |
| 5,699,413 | A | * | 12/1997 | Sridhar ............ 379/93.09 |
| 5,704,364 | A | * | 1/1998 | Saltzstein et al. ............ 600/300 |
| 5,812,201 | A | * | 9/1998 | Yoo ............ 348/423.1 |
| 5,915,000 | A | | 6/1999 | Nguyen et al. |
| 5,949,874 | A | * | 9/1999 | Mark ............ 379/283 |
| 5,983,253 | A | * | 11/1999 | Fischer et al. ............ 708/300 |
| 5,995,599 | A | | 11/1999 | Dunn et al. |
| 6,112,084 | A | * | 8/2000 | Sicher et al. ............ 370/337 |
| 6,496,486 | B2 | * | 12/2002 | Hamdi ............ 370/260 |
| 6,678,653 | B1 | * | 1/2004 | Tsushima et al. ............ 704/220 |
| 6,724,416 | B1 | * | 4/2004 | Liu ............ 348/14.02 |
| 6,751,303 | B1 | | 6/2004 | Cook |
| 6,760,413 | B2 | * | 7/2004 | Cannon et al. ............ 379/88.19 |
| 6,813,360 | B2 | * | 11/2004 | Gentle ............ 381/23 |
| 6,865,276 | B1 | * | 3/2005 | Ljungberg et al. ............ 381/94.1 |
| 7,164,756 | B1 | * | 1/2007 | Satapathy ............ 379/93.03 |

(Continued)

FOREIGN PATENT DOCUMENTS

DE    19901476    7/2000

(Continued)

OTHER PUBLICATIONS

"International Application Serial No. 06001860.3, Extended European Search Report mailed Jun. 2, 2006", 9 pgs.

*Primary Examiner* — Gerald Gauthier
(74) *Attorney, Agent, or Firm* — Schwegman, Lundberg & Woessner, P.A.

(57) ABSTRACT

An embodiment includes a method that includes receiving data through a non-voice input. The method also includes translating the data into one or more numeric values. The method includes encoding the one or more numeric values into an audio stream, wherein the audio stream is to be transmitted over a transmission medium that is in use for voice communication.

18 Claims, 4 Drawing Sheets

U.S. PATENT DOCUMENTS

| | | | |
|---|---|---|---|
| 7,221,663 B2 * | 5/2007 | Rodman et al. | 370/329 |
| 7,266,091 B2 * | 9/2007 | Singh et al. | 370/260 |
| 7,274,779 B2 * | 9/2007 | Casey | 379/93.18 |
| 7,295,836 B2 * | 11/2007 | Yach et al. | 455/415 |
| 7,334,024 B2 * | 2/2008 | Martino | 709/217 |
| 7,339,605 B2 * | 3/2008 | Rodman et al. | 348/14.07 |
| 7,483,418 B2 * | 1/2009 | Maurer | 370/354 |
| 7,526,078 B2 * | 4/2009 | Rodman et al. | 379/202.01 |
| 7,545,802 B2 * | 6/2009 | Gass | 370/352 |
| 7,590,692 B2 * | 9/2009 | Van Dyke et al. | 709/206 |
| 7,821,918 B2 * | 10/2010 | Rodman et al. | 370/212 |
| 2001/0036174 A1 * | 11/2001 | Herring | 370/352 |
| 2003/0224815 A1 * | 12/2003 | Rodman et al. | 455/517 |
| 2004/0022272 A1 * | 2/2004 | Rodman et al. | 370/494 |
| 2004/0022375 A1 * | 2/2004 | Rodman et al. | 379/90.01 |
| 2004/0165665 A1 * | 8/2004 | Harumoto et al. | 375/240.26 |
| 2005/0111493 A1 * | 5/2005 | Han et al. | 370/509 |
| 2006/0033809 A1 * | 2/2006 | Farley | 348/14.01 |
| 2006/0133624 A1 * | 6/2006 | Waserblat et al. | 381/119 |
| 2007/0143622 A1 * | 6/2007 | Labaton | 713/176 |

FOREIGN PATENT DOCUMENTS

| | | |
|---|---|---|
| WO | WO-9427397 A1 | 11/1994 |
| WO | WO-9519086 A1 | 7/1995 |

* cited by examiner

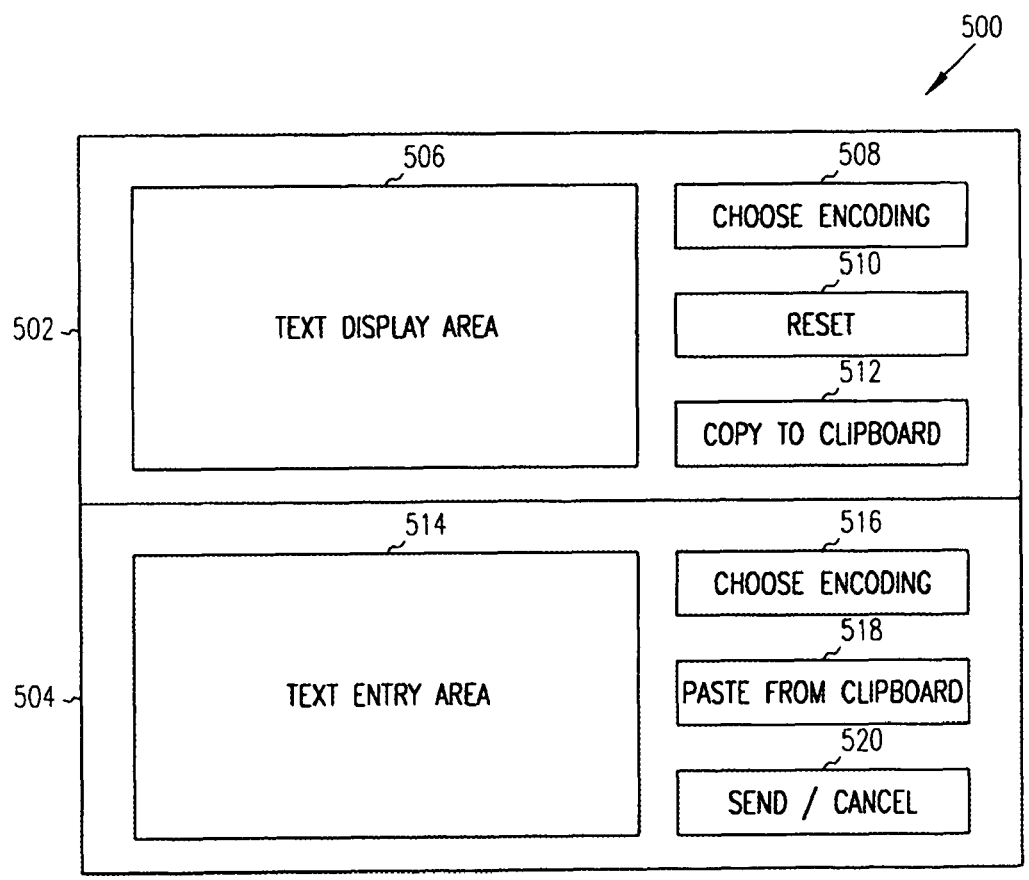

DATA TRANSMISSION OVER AN IN-USE TRANSMISSION MEDIUM

TECHNICAL FIELD

The application relates generally to data communications, and, more particularly, to data transmission over an in-use transmission medium.

BACKGROUND

Telephonic communication between persons may involve the exchange of information that is required to be precise. Examples of such information include telephone numbers, spelling of persons' names, street addresses, ZIP codes, flight reservation codes, credit card numbers, bank account numbers, etc.

Because of different accents and different spellings of words, orally communicating this type of information between persons can be time consuming and socially awkward. For example, even between native English speakers, the pronunciation of letters, such as A, I or R, may vary considerably. The French language can also be problematic in these situations. In particular, the different accents of persons speaking French may make it difficult to clearly differentiate between different words. For example, it may be difficult to differentiate between the word for the number "cent" (one hundred) and the word for the number "cinq" (five) because the final letter in "cinq" is usually silent. In some settings, asking a person to repeat or spell out their last name may be considered offensive.

SUMMARY

Methods, apparatus and systems for data transmission over an in-use transmission medium are described. Some embodiments include a method that includes receiving data from a user through a non-voice input. The method also includes encoding the data into an audio stream that is received by a microphone of a telephony device for transmission over a transmission medium that is currently in use for transmitting an audio conversation.

Some embodiments include a method that includes receiving data through a non-voice input. The method also includes translating the data into one or more hexadecimal values. The method includes encoding the one or more hexadecimal values into an audio stream, wherein the audio stream is to be transmitted over a transmission medium that is in use for voice communication.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings:

FIG. 4 illustrates a table of DTMF values for encoding/decoding of DTMF values, according to some embodiments of the invention.

FIG. 5 illustrates a screen shot for receiving and transmitting of data over an in-use transmission medium, according to some embodiments of the invention.

DETAILED DESCRIPTION

Methods, apparatus and systems for data transmission over an in-use transmission medium are described. In the following description, numerous specific details are set forth. However, it is understood that embodiments of the invention may be practiced without these specific details. In other instances, well-known circuits, structures and techniques have not been shown in detail in order not to obscure the understanding of this description.

Some embodiments allow for transmitting of encoded characters over a transmission medium that is currently being used for a conversation between two or more persons. For example, some embodiments allow for transmitting of short text messages between two persons over a telephone line (such as a Plain Old Telephone Service (POTS) line) that is being used for a conversation between these two persons. Such messaging allows for the communication of data that is required to be accurate. Examples of such data may include telephone numbers, spelling of persons' names, street addresses, ZIP codes, flight reservation codes, credit card numbers, bank account numbers, etc. The term character as used herein may include any type of symbol including letters, numbers, punctuation, etc. For example, the term character may include any type of American Standard Code for Information Interchange (ASCII) character.

Figure 1:
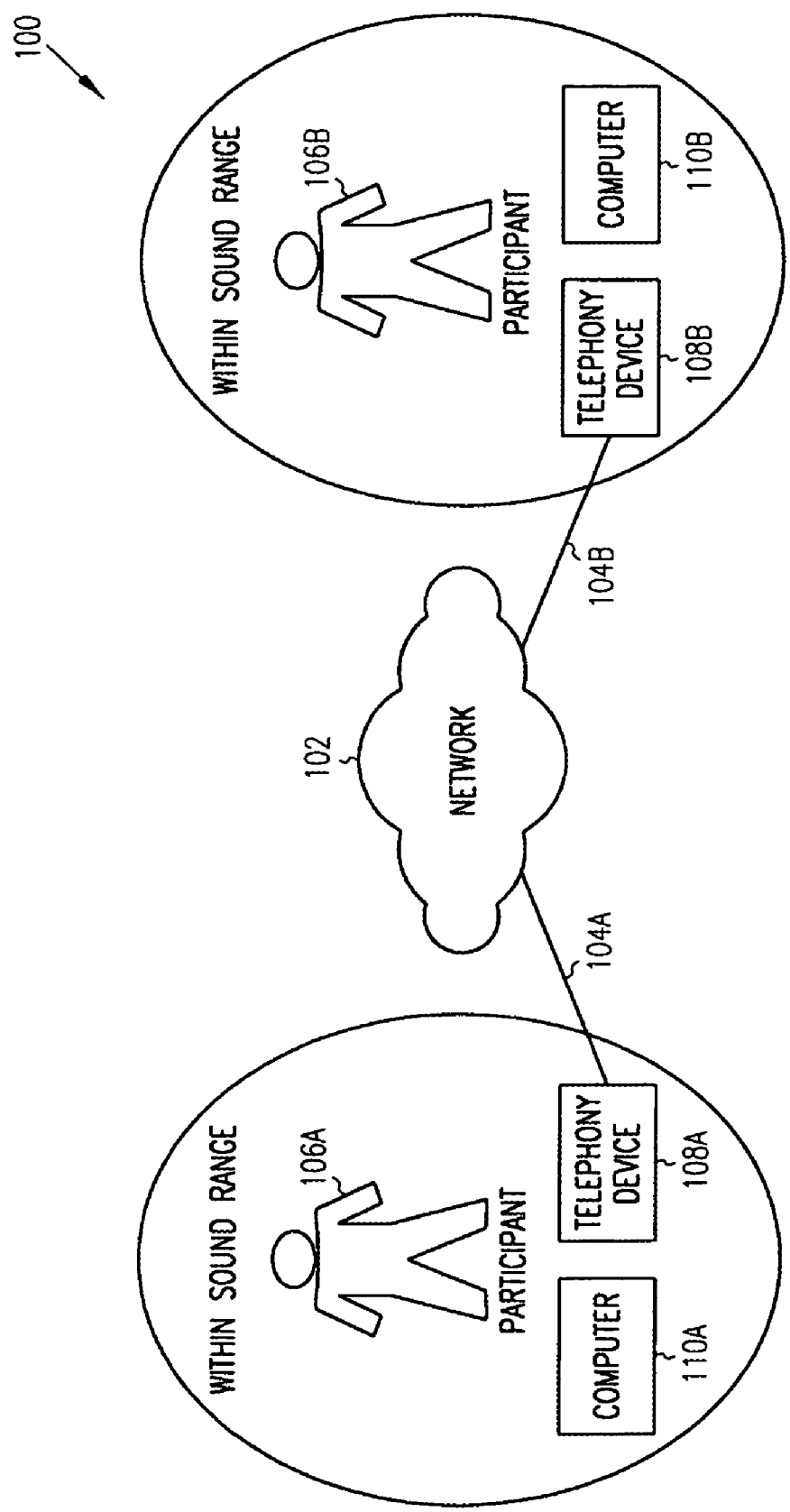
FIG. 1 illustrates a system for data transmission over an in-use transmission medium, according to some embodiments of the invention.

FIG. 1 illustrates a system for data transmission over an in-use transmission medium, according to some embodiments of the invention. In particular, FIG. 1 illustrates a system 100 that includes a telephony device 108A and a telephony device 108B that are coupled together through a network 102 using a transmission medium 104A and a transmission medium 104B, respectively. Examples of the transmission mediums 104A-104B may be a telephone line (such as a POTS line), a fiber optics line, etc. The transmission mediums 104A-104B may also be representative of different types of wireless mediums (such as over the air). The telephony devices 108A-108B may be representative of any type of instrument or system used, at least in part, for voice communication.

The system 100 also includes a computer 110A and a computer 1101B, which may or may not be coupled to the telephony device 108A and the telephony device 108B, respectively. The system 100 includes a participant 106A and a participant 106B. In some embodiments, the participant 106A, the telephony device 108A and the computer 110A are in sound range of each other. In some embodiments, the participant 106B, the telephony device 108B and the computer 110B are in sound range of each other. For example, the telephony device 108A and the telephony device 108B may be set in speaker phone configurations. Accordingly, the microphone of the telephony device 108A may receive sound from the speaker of the computer 110A and the participant 106A. Similarly, the microphone of the telephony device 108B may receive sound from the speaker of the computer 110B and the participant 106B.

Figure 2:
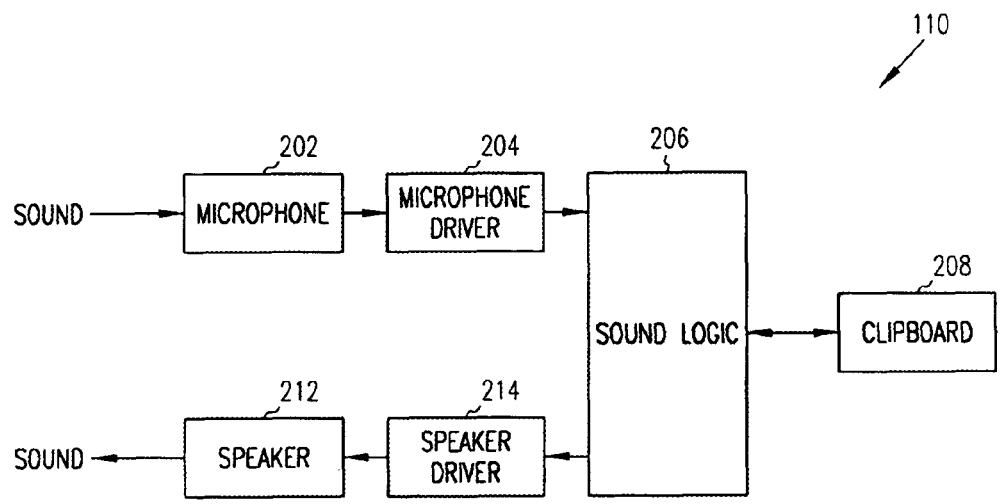
FIG. 2 illustrates a more detailed block diagram of the computer, according to some embodiments of the invention.

FIG. 2 illustrates a more detailed block diagram of the computer 110, according to some embodiments of the invention. The computer 110 includes a microphone 202, a microphone driver 204, a sound logic 206, a clipboard 208, a speaker 212 and a speaker driver 214. The microphone 202 and the speaker 212 may be either internal or external to the computer 110. For example, if external, the microphone 202 and the speaker 212 may be coupled into the computer 110 through a port of a sound card (not shown).

The clipboard 208 may be part of different types of machine-readable media used for data storage. Examples of the types of machine-readable media may include different types of memory such as different types of Random Access Memory (RAM) (e.g., Synchronous Dynamic RAM (SDRAM), DRAM, Double Data Rate (DDR)-SDRAM, etc.) Other types of machine-readable media may include magnetic disk storage media, optical storage media, flash memory devices, etc.

The microphone 202 may receive sound. The microphone 202 is coupled to the microphone driver 204, which may receive the sound from the microphone 202 and convert the sound into an audio stream. In some embodiments, the sound received by the microphone 202 may be a combination of voice communication and encoded values. In some embodiments, the encoded values may be based on Dual Tone Multi-Frequency (DTMF) encoding. The microphone driver 204 is coupled to input the audio stream into the sound logic 206. The sound logic may generate characters based on the audio stream (as further described below). The sound logic 206 is coupled to the clipboard 208. The sound logic 206 may copy/move the characters into the clipboard 208. As further described below, the sound logic 206 may display the characters on a display.

The sound logic 206 may also receive characters from the clipboard 208, input from a user, etc. For example, the sound logic 206 may receive character input through a non-voice input (such as a keyboard). The sound logic 206 may encode the characters into an audio stream. In some embodiments, the sound logic 206 may encode the characters into sounds that are at frequencies within the audible frequency spectrum. In some embodiments, these frequencies are in a range that is not naturally present in the human voice. In some embodiments, the sound logic 206 may encoded based on DTMF encoding. The sound logic 206 is also coupled to the speaker driver 214, which is coupled to the speaker 212. The speaker driver 214 may receive the audio stream and cause the speaker 212 to output the audio stream.

The microphone driver 204, the speaker driver 214 and the sound logic 206 may be software, hardware, firmware or a combination thereof For example, the microphone driver 204, the speaker driver 214 and the sound logic 206 may be software instructions that are executed on a processor (not shown). In some embodiments, the microphone driver 204 and the speaker driver 214 may be a single driver that is part of the operating system of the computer 110. For example, the microphone driver 204 and the speaker driver 214 may be part of the operating system and used for communicating with a sound card of the computer 110. This single driver may control the input and output of sound into and from the computer 110. Accordingly, as described, the computer 110 may receive and transmit sound that includes encoded values representative of characters.

Figure 3:
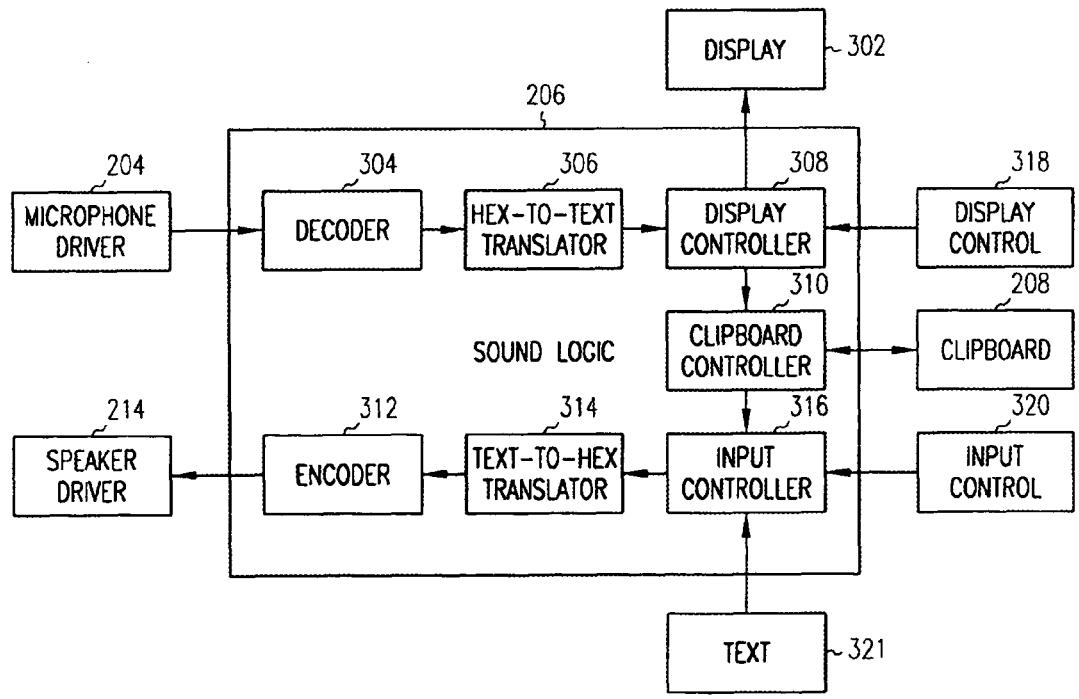
FIG. 3 illustrates a more detailed block diagram of the sound logic, according to some embodiments of the invention.

FIG. 3 illustrates a more detailed block diagram of the sound logic 206, according to some embodiments of the invention. The sound logic 206 may include a decoder 304, a hex-to-text translator 306, a display controller 308, a clipboard controller 310, an input controller 316, an encoder 312 and a text-to-hex translator 314.

The microphone driver 204 is coupled to input sound data into the decoder 304. For example, the microphone driver 204 may input an audio stream. The decoder 304 may convert the sound data into encoded values, which are representative of the sound data. The encoded values may be different types of alphanumeric values, numeric values, alpha values, etc. For example, the encoded values may be a number of hexadecimal values. In some embodiments, the decoder 304 may detect Dual Tone Multi-Frequency (DTMF) values within the sound data and output corresponding hexadecimal values. A more detailed description of the DTMF encoding/decoding is set forth below in conjunction with FIG. 4.

The hex-to-text translator 306 is coupled to receive the hexadecimal values from the decoder 304. The hex-to-text translator 306 may generate text based on the hexadecimal values using any of a number of different encoding operations. In some embodiments, multiple hexadecimal values generate one text character. In some embodiments, for each hexadecimal value, the hex-to-text translator 306 may generate one text character that directly represents the value. For example, the characters may be '0' to '9' and 'A' to 'F'. Accordingly, the sequence of DTMF values '5 A 8 2 3 0 E' is translated into the character string "5A8230E".

In some embodiments, for each pair of hexadecimal values, the hex-to-text translator 306 may generate a byte value. The first hexadecimal value may be the most significant part of the byte, while the second hexadecimal value may be the least significant part of the byte. In some embodiments, the hex-to-text translator 306 may use a Unicode standard for encoding characters from many different alphabets using two-byte characters (i.e., four hexadecimal values). The sound captured by the microphone 202 and subsequently converted into hexadecimal values may relate to an Internet Protocol (IP) address. In some embodiments, the IP address may be represented by four bytes, which are encoded as eight DTMF values. For example, the DTMF values 'A 0 F 3 0 6 E 6' are translated into the character string "160.243.5.230".

The display controller 308 may be coupled to receive the characters from the hex-to-text translator 306. The display controller 308 may be coupled to the display 302 to display the characters thereon. One example of a user interface screen to input and output data (which may be displayed on the display 302) is illustrated in FIG. 5, which is described in more detail below. The display controller 308 is also coupled to receive display control commands 318. The display control commands 318 may be received from users to control the reception and display of the messages. The display control commands 318 may be implemented using buttons, drop-down lists, etc.

One display control command 318 may include a reset command that may clear the display 302 and cause the hex-to-text translator 306 to reset its internal state. Another display control command 318 may relate to the type of encoding that is to be used. For example, the default encoding operation is hexadecimal. Another display control command 318 may cause the display controller 308 to control the clipboard controller 310 to copy the content of a text display area into the clipboard 208. The clipboard controller 310 is coupled to the display controller 308, the clipboard 208 and the input controller 316.

The input controller 316 is coupled to receive input control commands 320 and characters 321. The input controller 316 may control the outputting of characters to the text-to-hex translator 314. One input control command 320 may be a send/cancel command. If no message is currently being sent, the send/cancel command causes the transmission of the content of the text entry area on the display 302 through the input control commands 320. If a message is in the process of being sent, the send/cancel command causes the sending of the message to be aborted. Another input control command 320 may be text that is to be sent out. For example, a user may input the text into a text entry area on the display 302, which is shown as text 321 being input into the input controller 316. Another input control command 320 may relate to the type of encoding used (similar to the display control command 318 described above). Another input control command 320 causes the content from the clipboard 208 to be copied into the text entry area of the display 302.

The text-to-hex translator 314 may receive the characters from the input controller 316 and generate encoded values. In some embodiments, the encoded values may be hexadecimal values, which may be encoded according to one of a number of different types of encoding operations. Examples of the different types of encoding operations have been set above in conjunction with the description of the hex-to-text translator 306.

The encoder 312 may receive the output from the text-to-hex translator 314. The encoder 312 may perform the reverse operation of the decoder 304. The encoder 312 may receive the encoded values from the text-to-hex translator 314 and generate an audio stream that contains DTMF frequencies that correspond to the encoded values received as input. The speaker driver 214 is coupled to output sound to the speaker 212.

DTMF encoding/decoding, according to some embodiments, is now described. DTMF encoding allows for transmission of hexadecimal values over a transmission medium. DTMF values may range from 0 to 9 and from A to F, which effectively describe 16 different values. FIG. 4 illustrates a table of DTMF values for encoding/decoding of DTMF values, according to some embodiments of the invention. In particular, FIG. 4 illustrates a table 400 that includes four columns and four rows. The four columns are for four different frequencies ($f_1$, $f_2$, $f_3$ and $f_4$), respectively. The four rows are for four other different frequencies ($f_5$, $f_6$, $f_7$ and $f_8$), respectively. For two frequencies, there is a corresponding value. For example, for the frequencies ($f_1$ and $f_5$), the corresponding value is $v_1$. For the frequencies ($f_4$ and $f_8$), the corresponding value is $v_{16}$.

The encoder 312 may encode two of the frequencies for a same time period within the audio stream being transmitted to the speaker driver 214. For example, if the DTMF value $v_6$ is received from the text-to-hex translator 314, the encoder 312 may encode the frequency $f_2$ and the frequency $f_6$ into the audio stream for a given time period.

The decoder 304 may include eight different filters, wherein each filter is configured to detect one of the eight frequencies. Therefore, a first filter is configured to detect the frequency $f_1$, the second filter is configured to detect the frequency, $f_2$, etc. After two frequencies are detected approximately simultaneously for at least a specified time period, the decoder 304 has detected the corresponding value in the audio stream.

Additionally, while described for used with DTMF encoding, some embodiments may be used with other types of encoding may be used. Furthermore, more or less frequencies may be used to represent values. For example, some embodiments may allow for an 8×8 matrix that includes 16 different frequencies that represent 64 different values.

FIG. 5 illustrates a screen shot for receiving and transmitting of data over an in-use transmission medium, according to some embodiments of the invention. The screenshot 500 includes a receiving part 502 and a transmitting part 504.

The receiving part 502 includes a text display area 506, a choose-encoding button 508, a reset button 510 and a copy-to-clipboard button 512. The text display area 506 may be used to display the characters that have been decoded from the audio stream. The choose-encoding button 508 may allow for the selection of any of a number of different types of encoding operations for encoding characters into the audio stream (as described above). After selection, the copy-to-clipboard button 512 may copy the characters in the text display area into the clipboard 208.

The transmitting part 504 includes a text entry area 514, a choose-encoding button 516, a paste-from-clipboard button 518 and a send/cancel button 520. The text entry area 514 may receive input (for example through keyboard input). Such input may subsequently being encoded into the audio stream of the audio conversation being transmitted over the transmission medium. The choose-encoding button 508 may allow for the selection of any of a number of different types of encoding operations for encoding characters into the audio stream (as described above). After selection, the paste from clipboard button 518 may copy the characters from the clipboard 208 into the text entry area 514. A more detailed description of the components of the screenshot 500 is set forth below.

Figure 6:
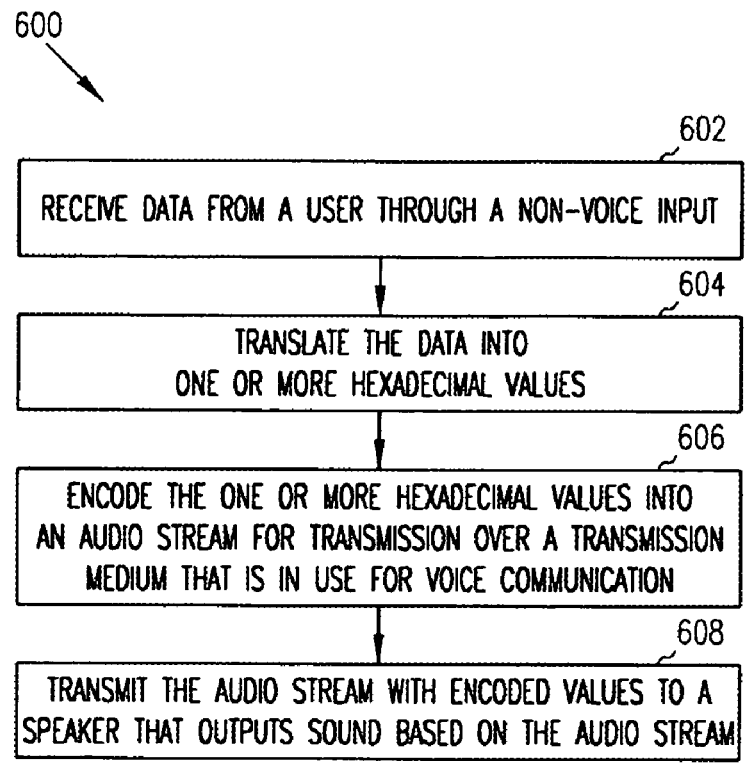
FIG. 6 illustrates a flow diagram of operations for transmitting data over an in-use transmission medium, according to some embodiments of the invention.
Figure 7:
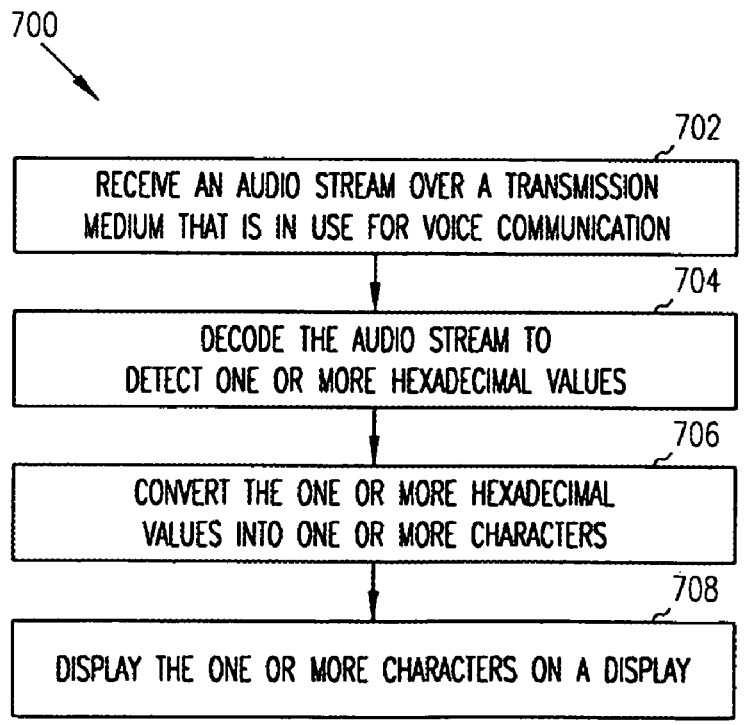
FIG. 7 illustrates a flow diagram of operations for receiving data over an in-use transmission medium, according to some embodiments of the invention.

This section provides a description of operations related to receiving and transmitting of data over an in-use transmission medium, according to some embodiments of the invention. In some embodiments, the operations may be performed by instructions residing on machine-readable media (e.g., software), by hardware, firmware, or a combination thereof. FIG. 6 and FIG. 7 illustrate flow diagrams for transmitting and receiving, respectively, data over an in-use transmission medium (such as a telephone line, a packet-switch network, etc.). To help illustrate, the following may be a typical scenario for such operations (hereinafter "the typical scenario"). A first user (e.g., the sender) and a second user (e.g., the receiver) may be talking over the telephone. At some point during the conversation, the first user (the sender) may inform the second user (the receiver) that they are going to transmit an IP address, according to some embodiments of the invention. The first user (the sender) and the second user (the receiver) set the encoding to the same type of encoding operation. With reference to FIG. 5, the first user (the sender) and the second user (the receiver) set the encoding using the choose-encoding button 516 and the choose encoding button 508, respectively.

With reference to FIG. 1, a voice communication may be occurring between the participant 106A and the participant 106B through the telephony device 108A and the telephony device 108B, respectively. In some embodiments, the telephony device 108A and the telephony device 108B are in a speaker phone configuration. Accordingly, the speaker 212 of the computer 110A and the speaker 212 of the computer 110B may be in sound range of the microphone of the telephony device 108A and the microphone of the telephony device 108B, respectively.

FIG. 6 illustrates a flow diagram of operations for transmitting data over an in-use transmission medium, according to some embodiments of the invention. The flow diagram 600 is described in reference to FIG. 3. The flow diagram 600 commences at block 602.

At block 602, the input controller 316 receives data from a user through a non-voice input. For example, the user may input the data (e.g., a character string) using a keyboard that is received as part of the input control commands 320. Returning to the typical scenario, the first user may type in the IP address into the text entry area 514. Alternatively or in addition, the input controller 316 may receive the data from the clipboard 208. The first user may then select the send/cancel button 520, which causes the data to be received by the input controller 316. The flow continues at block 604.

At block 604, the text-to-hex translator 314 translates the data into one or more hexadecimal values. The text-to-hex translator 314 may receive a character string and convert this string into a sequence of hexadecimal values, according to a selected encoding operation. For example, as described above, the users may select the type of encoding based on the choose encoding buttons 508/516. Alternatively, the encoding operation may not be selectable. Rather, the encoding operation may be set to one particular type. The flow continues at block 606.

At block 606, the encoder 312 encodes the one or more hexadecimal values into an audio stream for transmission over a transmission medium that is in use for voice communication. In some embodiments, the encoder 312 may generate a first sound at a first frequency and a second sound at a second frequency for a given hexadecimal value (see description above regarding FIG. 4). The encoder 312 may incorporate this first sound and this second sound into the audio stream for a substantially same time period. In some embodiments, the first frequency and the second frequency are within the audible frequency spectrum. In some embodiments, the first frequency and the second frequency are at frequencies that are not naturally present in the human voice. Accordingly, the decoder 304 may distinguish between these encoded frequencies and the frequencies of the human voice that may also be part of the audio stream. The flow continues at block 608.

At block 608, the speaker driver 214 transmits the audio stream (with the encoded values) to the speaker 212 that outputs sound based on the audio stream. Referring to FIG. 1, the speaker 212 may be part of the computer 110A. The telephony device 108A may be set in a speaker phone configuration. Accordingly, the telephony device 108 is in the sound range of the computer 110A. The sound output from the speaker 212 may be received into the microphone of the telephony device 108A. The sound, therefore, is transmitted to the telephony device 108B over the transmission mediums 104A-104B. The operations of the flow diagram 600 are complete.

The operations of processing of the sound transmitted over the transmission mediums 104A-104B are now described. In particular, FIG. 7 illustrates a flow diagram of operations for receiving data over an in-use transmission medium, according to some embodiments of the invention. The flow diagram 700 is described in reference to FIG. 3. The flow diagram 700 commences at block 702.

At block 702, the decoder 304 receives an audio stream over a transmission medium that is in use for voice communication. The decoder 304 may receive the audio stream through the microphone 202 using the microphone driver 204. With reference to FIG. 1, the decoder 304 may be part of the computer 110B. The audio stream may be transmitted over the transmission mediums 104A and 104B. In particular, the encoder 312 that is part of the computer 110A may have generated an audio stream that includes the encoded values (DTMF values) that are representative of one or more symbols (as described above in conjunction with FIG. 6). The audio stream may be output from a speaker of the computer 110A, which is received by a microphone of the telephony device 108A. The audio stream may be incorporated into the audio stream that may be occurring between the telephony device 108A and the telephony device 108B. Returning to the typical scenario, the computer 110B for the second user may receive the IP address over the transmission medium while the first user and the second user continue a voice conversation using the same transmission medium. The flow continues at block 704.

At block 704, the decoder 304 decodes the audio stream to detect the one or more hexadecimal values. As described above, the decoder 304 may detect a particular hexadecimal value based on detection of two frequencies for an approximately same time period. The flow continues at block 706.

At block 706, the hex-to-text translator 306 converts the one or more hexadecimal values into one or more characters. As described above, the hex-to-text translator 306 may perform this conversion based on any of a number of different encoding operations, which may or may not be user-configurable. The flow continues at block 708.

At block 708, the display controller 308 causes the one or more characters to be displayed on the display 302. Alternatively or in addition, the display controller 308 may cause the one or more characters to be stored in a machine-readable medium (e.g., the clipboard 208). Returning to the typical scenario, the second user may now view the IP address on the display 302, thereby avoiding miscommunications of such address. The operations of the flow diagram 700 are complete.

As described, some embodiments allow text messages to be transmitted over a regular telephone line that is already in use by humans, without requiring any additional communication devices. Some embodiments allow for the transmission of short text messages between two persons that are already involved in a voice communication using a same transmission medium.

Embodiments are not limited to the configurations shown above. For example, instead of having a computer on the sender side, only a telephony device may be used. The participant may simply press the keys of the telephony device, which is translated into text at the receiving side, according to the encoding selected by the receiving side. Moreover, while described such that the telephony device and the computer are separate, some embodiments may incorporate the telephony device and the computer into a same device. For example, some embodiments may be incorporated into a portable device (such as a Personal Digital Assistant (PDA)) that allows for voice communications as well as non-voice input.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for data transmission over an in-use transmission medium, in accordance with some embodiments of the invention. Flow diagrams illustrate the operations for data transmission over an in-use transmission medium, in accordance with some embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method including:
receiving an encoding operation type;
receiving a sound communication at frequencies within an audible frequency spectrum in an audio stream over a transmission medium, the sound communication comprising:
a voice communication that is part of a conversation between a first person and a second person, and
non-voice data encoding one or more values;
decoding, based on the encoding operation type, using a decoder, the sound communication to detect the one or more values in the non-voice data; and
displaying, using a display controller, the one or more values on a display viewable by the second person while the conversation between the first person and the second person is continuing to occur.

2. The method of claim 1, further including converting the one or more values into one or more characters.

3. The method of claim 2, wherein converting the one or more values into the one or more characters including converting one value directly into one character.

4. The method of claim 2, wherein converting the one or more values into the one or more characters includes:
converting a first value into a most significant part of a byte representative of the character; and
converting a second value into a least significant part of the byte.

5. The method of claim 1, wherein decoding the sound communication to detect one or more values includes decoding the sound communication to detect one or more hexadecimal values.

6. The method of claim 1, wherein decoding the sound communication to detect one or more values includes decoding the sound communication to detect one or more Dual Tone Multi-Frequency values.

7. The method of claim 1, wherein decoding the sound communication to detect one or more values in the non-voice data communication includes decoding a first sound at a first frequency and a second sound at a second frequency at approximately a same time period.

8. A non-transitory machine-readable storage medium that provides instructions that, when executed by a machine, cause said machine to perform operations including:
receiving an encoding operation type;
receiving, from a first person, a sound communication that is part of a voice conversation between the first person and a second person;
transmitting the sound communication in an audio stream over a transmission medium for receiving by a device accessible by the second person;
receiving, from the first person, data through a non-voice input at frequencies within an audible frequency spectrum;
translating, based on the encoding operation type, the data into one or more numeric values; and
encoding the one or more numeric values into the sound communication in the audio stream, wherein the one or more numeric values encoded into the sound communication are decoded by the device accessible by the second person for viewing the data while the voice conversation between the person and the second person is continuing to occur.

9. The machine-readable storage medium of claim 8, further including outputting the audio stream to a speaker that outputs sound based on the audio stream, wherein the sound is received by a microphone of a telephone for transmission over the transmission medium that is in use for voice communication.

10. The machine-readable storage medium of claim 8, wherein encoding the one or more numeric values into a sound in the audio stream includes encoding the one or more numeric values into a sound that is at a frequency that is within an audible spectrum.

11. The machine-readable storage medium of claim 8, wherein encoding the one or more numeric values into a sound in the audio stream includes encoding a first sound at a first frequency and a second sound at a second frequency into the audio stream for approximately a same time period.

12. The machine-readable storage medium of claim 8, wherein the one or more numeric values are one or more Dual Tone Multi-Frequency (DTMF) values.

13. The machine-readable storage medium of claim 8, wherein translating the data into one or more numeric values comprises translating the data into one or more hexadecimal values.

14. A system including:
sound logic to receive an encoding operation type and encode, based on the encoding operation type, data into a sound communication in an audio stream, the data comprising non-voice input at frequencies within an audible frequency spectrum and to be received from a first person;
a speaker; and
a speaker driver to cause the speaker to output sound based on the audio stream that includes the encoded data, wherein the sound is to be transmitted over an in-use transmission medium to transmit an audio conversation between the first person and a second person, wherein a device is configured to receive the encoded data from the in-use transmission medium, the device configured to display the data after decode on a display for the second person to view while the audio conversation is still occurring.

15. The system of claim 14, wherein the sound logic is to receive the data from a first user and wherein the audio conversation is at least between the first user and a second user.

16. The system of claim 14, further including a telephony device having a microphone that is in a sound range of the speaker during operation, wherein the telephony device is to transmit the audio conversation and the audio stream over the in-use transmission medium.

17. The system of claim 14, wherein the sound logic is to encode data into the audio stream based on a Dual Tone Multi-Frequency encode operation.

18. The system of claim 14, wherein the sound logic is to encode a first sound at a first frequency and a second sound at a second frequency into the audio stream for approximately a same time period.

* * * * *